United States Patent
Petisme et al.

(10) Patent No.: US 11,820,375 B2
(45) Date of Patent: Nov. 21, 2023

(54) METHOD FOR CONTROLLING A VEHICLE

(71) Applicant: VOLVO TRUCK CORPORATION, Gothenburg (SE)

(72) Inventors: Martin Petisme, Gothenburg (SE); Gustav Carlsson, Borås (SE); Erik Ströby, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 37 days.

(21) Appl. No.: 17/370,497

(22) Filed: Jul. 8, 2021

(65) Prior Publication Data

US 2022/0009490 A1    Jan. 13, 2022

(30) Foreign Application Priority Data

Jul. 10, 2020   (EP) ..................... 20185231

(51) Int. Cl.
*B60W 30/18*   (2012.01)
*B60L 7/18*    (2006.01)
(Continued)

(52) U.S. Cl.
CPC ......... *B60W 30/18127* (2013.01); *B60L 7/18* (2013.01); *B60W 10/18* (2013.01);
(Continued)

(58) Field of Classification Search
CPC ......... B60L 7/18; B60W 10/18; B60W 20/14; B60W 2510/244; B60W 2552/20;
(Continued)

(56) References Cited

U.S. PATENT DOCUMENTS 9,656,671 B2 *   5/2017   Martin ................ B60W 10/08
2016/0257295 A1 *   9/2016   Miller ............... B60W 50/0097
(Continued)

FOREIGN PATENT DOCUMENTS

EP   3153365 A1   4/2017
EP   3254879 A1   12/2017

OTHER PUBLICATIONS

European Search Report dated Jan. 27, 2021 in corresponding European Patent Application No. 20185231.6, 5 pages.

*Primary Examiner* — Jeff A Burke
*Assistant Examiner* — Zachary Joseph Wallace
(74) *Attorney, Agent, or Firm* — Venable LLP; Jeffri A. Kaminski

(57) ABSTRACT

The invention relates to a method for controlling a vehicle (1) comprising an electric powertrain, an energy storage system (ESS), regenerative braking functionality and cruise control functionality,
wherein the cruise control functionality is configured to maintain a set cruise control speed of the vehicle during downhill travel by applying the regenerative braking functionality, the method comprising:
obtaining (S11) a tolerance limit for an allowed increase in energy consumption caused by non-use of regenerative braking during downhill travel;
obtaining (S12) information relating to an upcoming downhill road segment (DRS);
based on the information relating to the upcoming downhill road segment (DRS), setting (S13) an allowed overspeed, caused by non-use or reduced use of the regenerative braking functionality, wherein the allowed overspeed exceeds the set cruise control speed for the upcoming downhill road segment (DRS) and is set based on the tolerance limit; and
(Continued)

in the upcoming downhill road segment (DRS), controlling regenerative braking and rolling of the vehicle based on the set allowed overspeed, thereby reducing or preventing regenerative braking during the downhill travel. The invention also relates to a control unit, a vehicle, a computer program and to a computer readable medium.

15 Claims, 2 Drawing Sheets

(51) Int. Cl.
    *B60W 10/18*     (2012.01)
    *B60W 30/14*     (2006.01)
    *B60W 40/06*     (2012.01)
    *B60W 40/105*     (2012.01)
    *B60W 40/13*     (2012.01)

(52) U.S. Cl.
    CPC .......... *B60W 30/143* (2013.01); *B60W 40/06* (2013.01); *B60W 40/105* (2013.01); *B60W 40/13* (2013.01); *B60W 2510/244* (2013.01); *B60W 2710/083* (2013.01)

(58) Field of Classification Search
    CPC ......... B60W 2552/25; B60W 2556/50; B60W 2720/10; B60W 30/143; B60W 30/14; B60W 30/18072; B60W 30/18127; B60W 40/06; B60W 40/1015; B60W 40/13; B60W 50/0097
    See application file for complete search history.

(56) References Cited

U.S. PATENT DOCUMENTS

| | | | |
|---|---|---|---|
| 2017/0087993 A1* | 3/2017 | Elkenkamp | ............... B60T 7/18 |
| 2018/0236994 A1 | 8/2018 | Healy et al. | |
| 2018/0326852 A1* | 11/2018 | Shiozawa | ............. B60W 30/00 |
| 2019/0039596 A1 | 2/2019 | Hawley | |
| 2019/0283584 A1 | 9/2019 | Koebler et al. | |
| 2021/0053552 A1* | 2/2021 | Szczepaniak | ......... B60W 10/18 |
| 2021/0276426 A1* | 9/2021 | Cote | ................... B60L 15/2009 |
| 2021/0394622 A1* | 12/2021 | Gaither | ............... B60L 15/2009 |

* cited by examiner

METHOD FOR CONTROLLING A VEHICLE

TECHNICAL FIELD

The invention relates to a method for controlling a vehicle comprising an electric powertrain, an energy storage system (ESS), regenerative braking functionality and cruise control functionality. The invention also relates to a control unit, a vehicle, a computer program and a computer readable medium.

The invention can be applied in heavy-duty vehicles, such as trucks, buses and construction equipment. Although the invention will be described with respect to a heavy duty truck, the invention is not restricted to this particular vehicle, but may also be used in other vehicles such as other trucks, buses, construction equipment, and also passenger cars etc.

BACKGROUND

Vehicles which are equipped with an electric powertrain, i.e. a powertrain comprising at least one electric motor for propulsion of the vehicle, may include regenerative braking functionality in order to harvest energy during braking of the vehicle. The energy may be harvested by use of the at least one electric motor and can be stored in an on-board ESS, such as a battery for providing energy to the at least one electric motor. Accordingly, the electric motor can also be used as an electric generator.

The electric powertrain may be a fully electric powertrain which only is driven by one or more electric motors, or it may be a hybrid electric powertrain comprising at least one electric motor and one additional power source, such as an internal combustion engine.

Vehicles, such as trucks, also commonly comprise a cruise control functionality for maintaining a set cruise control speed during driving, such as during highway driving. In a downhill road segment, the set cruise control speed may be maintained by selectively applying the regenerative braking functionality of the vehicle. When the regenerative braking is not applied in the downhill road segment, the vehicle may roll, such as roll freely without any substantial braking effect on the wheels.

Even though the above mentioned vehicles which are equipped with regenerative braking and cruise control functionality are energy efficient, it has been realized that there is a need to develop further improved vehicle control functionality which provides energy efficiency while also providing increased service life.

SUMMARY

An object of the invention is to provide an improved method for controlling a vehicle comprising an electric powertrain, an energy storage system, regenerative braking functionality and cruise control functionality. Another object of the invention is to provide an improved control unit, an improved vehicle, a computer program and/or a computer readable medium.

According to a first aspect of the invention, the object is achieved by a method. According to a second aspect of the invention, the object is achieved by a control unit. According to a third aspect of the invention, the object is achieved by a vehicle. According to a fourth aspect of the invention, the object is achieved by a computer program. According to a fifth aspect of the invention, the object is achieved by a computer readable medium.

According to the first aspect of the invention, the object is achieved by a method for controlling a vehicle comprising an electric powertrain, an energy storage system, regenerative braking functionality and cruise control functionality. The cruise control functionality is configured to maintain a set cruise control speed of the vehicle during downhill travel by applying the regenerative braking functionality. The method comprises:

obtaining a tolerance limit for an allowed increase in energy consumption caused by non-use or reduced use of regenerative braking during downhill travel;

obtaining information relating to an upcoming downhill road segment;

based on the information relating to the upcoming downhill road segment, setting an allowed overspeed, caused by non-use or reduced use of the regenerative braking functionality, wherein the allowed overspeed exceeds the set cruise control speed for the upcoming downhill road segment and is set based on the tolerance limit; and in the upcoming downhill road segment, controlling regenerative braking of the vehicle based on the set allowed overspeed, thereby reducing or preventing regenerative braking during the downhill travel.

Preferably, the allowed overspeed for the upcoming downhill road segment is set so that the tolerance limit is not exceeded.

By controlling regenerative braking of the vehicle based on the set allowed overspeed, vehicle speed is controlled so that the vehicle does not exceed the allowed overspeed in the downhill road segment and/or so that the vehicle substantially maintains the set allowed overspeed in the downhill road segment.

By the provision of the method as disclosed herein, an improved method is achieved in which energy efficiency is provided whilst also the service life of the ESS can be increased. The service life can be increased in that energy throughput of the ESS can be reduced by reducing or preventing the use of regenerative braking in downhill road segments. As such, the method as disclosed herein may imply increased cost-efficiency. More particularly, it has been realized that in some situations during downhill travelling, the energy savings due to regenerative braking can be very small compared to e.g. rolling and allowing for some overspeed. Accordingly, the method may comprise controlling regenerative braking and rolling of the vehicle based on the set allowed overspeed. Rolling may be free rolling without any substantial braking effect on the wheels of the vehicle and/or rolling when a driveline of the vehicle is in engagement with driven wheels of the vehicle. Further, in order to maintain sufficient energy efficiency, it has been realized that it is advantageous to set a tolerance limit for an allowed increase in energy consumption. As such, it can be assured that the energy consumption does not exceed the tolerance limit.

Optionally, the tolerance limit may be set to a value corresponding to a 0-10%, such as 0-5%, increase in energy consumption.

Optionally, the ESS may be based on lithium-ion (Li-ion) cell technology, or any other battery cell technology. Due to chemical side reactions and morphological changes of the cell material, Li-ion cells will lose capacity and power ability with energy throughput during usage. Thereby, by the provision of the method as disclosed herein, the capacity and power ability of the ESS will be reduced at a slower rate, thus providing increased service life.

Optionally, the method may further comprise identifying the upcoming downhill road segment during travelling.

Purely by way of example, the upcoming downhill road segment may be identified by use of a forward looking perception sensor of the vehicle, such as a camera, a light detection and ranging (LIDAR) sensor, a radio detection and ranging (RADAR) sensor, a sound navigation ranging (SONAR) sensor or the like. Additionally, or alternatively, the upcoming downhill road segment may be identified by use of map data, which may be on-board map data and/or off-board map data. Off-board map data may thus be received by the vehicle, e.g. by use of wireless communication means, such as WiFi, Bluetooth, cellular technology (3 g, 4 g, 5 g etc.) or the like. The map data may be part of a global navigation satellite system (GNSS), such as a global positioning system (GPS).

Optionally, the obtained information relating to the upcoming downhill road segment may comprise information about inclination and length of the upcoming downhill road segment. Still optionally, the allowed overspeed may further be set based on weight information of the vehicle.

Optionally, the allowed overspeed may further be set based on driveline simulations in which, for the upcoming downhill road segment, net energy consumption is determined for different overspeeds exceeding the set cruise control speed. The driveline of the vehicle as used herein at least refers to the electric powertrain and the regenerative braking functionality of the vehicle. As such, a database, or the like, may be created for one or more downhill road segments, where net energy consumption is mapped against different overspeeds exceeding the set cruise control speed. Thereby, a more efficient method may be provided in which an allowed overspeed corresponding to the obtained tolerance limit can be easily retrieved and used. In addition, a more correct allowed overspeed may be selected, so that it corresponds to, or at least substantially corresponds to, the obtained tolerance limit.

Optionally, the allowed overspeed may further be set based on driveline simulations in which, for the upcoming downhill road segment, net energy consumption and energy throughput of the ESS are determined for different overspeeds exceeding the set cruise control speed. Thereby, the allowed overspeed may further be set in respect to an assumed energy throughput caused by use of the regenerative braking system, implying further improved selection of the allowed overspeed.

Optionally, the driveline simulations may be associated with one or more vehicle properties, such as any one of vehicle weight and vehicle dimensions. Thereby a further improved selection of the allowed overspeed may be performed. More particularly, the allowed overspeed may more accurately correspond to the actual characteristics of the vehicle, which also may vary over time. For example, the vehicle may be loaded or unloaded, it may have a trailer connected thereto or not, etc.

Optionally, the allowed overspeed may be set so that the energy throughput of the ESS is not exceeding a predetermined energy throughput threshold value. Thereby the control of the energy throughput may be improved, implying reduced wear of the ESS.

Optionally, the method may further comprise determining a state of charge level (SOC) of the ESS, and, in the upcoming downhill road segment, controlling regenerative braking of the vehicle based on the set cruise control speed when the SOC level is below a SOC threshold value. Thereby, when the SOC level is below the SOC threshold value, the method will allow the ESS to be charged so that its SOC level increases, implying further improved energy efficiency.

Optionally, the obtained information relating to the upcoming downhill road segment may comprise information about any one of current weather data during travelling, road condition data, road curvature data, and road data relating to a road segment following the upcoming downhill road segment. As such, more relevant information corresponding to the actual condition and/or characteristics of the upcoming downhill road segment may be obtained, implying further improved selection of the allowed overspeed. For example, information about a road segment following the upcoming downhill road segment may indicate that the vehicle may easily roll after the downhill road segment, e.g. due to a straight road segment. Thereby, the vehicle may better utilize the kinetic energy gained in the downhill road segment by rolling, implying reduced energy consumption. Accordingly, by this information the allowed overspeed may be more accurately set, taking e.g. the following straight road segment into account.

Optionally, the allowed overspeed may further be set based on information about a planned route for the vehicle, such as a planned route including one or more planned stops, which one or more planned stops may include recharging of the ESS. For example, if it is planned to stop and charge the ESS of the vehicle right after the downhill road segment, this may also be taken into account when setting the allowed overspeed.

Optionally, the obtained tolerance limit may be set by a user of the vehicle or it may be a fixed predefined tolerance limit. The fixed predefined tolerance limit may for example be set by the manufacturer of the vehicle. A user of the vehicle may be a driver of the vehicle or an owner of the vehicle, such as a fleet owner having a fleet of vehicles. By allowing a user to set the tolerance limit, the method may be tailored for different needs. For example, the tolerance limit may be set and varied in dependence on the price level for energy, which may fluctuate over time.

According to the second aspect of the invention, the object is achieved by a control unit for controlling a vehicle comprising an electric powertrain, an ESS, regenerative braking functionality and cruise control functionality, the control unit being configured to perform the steps of the method according to any one of the embodiments of the first aspect of the invention.

Advantages and effects of the second aspect of the invention are similar to the advantages and effects with respect to the first aspect of the invention. It shall also be noted that all embodiments of the first aspect of the invention are applicable to and combinable with all embodiments of the second aspect of the invention and vice versa.

According to the third aspect of the invention, the object is achieved by a vehicle comprising an electric powertrain, an ESS, regenerative braking functionality and cruise control functionality, and further comprising the control unit according to the second aspect of the invention.

Advantages and effects of the third aspect of the invention are similar to the advantages and effects with respect to the first and second aspects of the invention. It shall also be noted that all embodiments of the first and second aspects of the invention are applicable to and combinable with all embodiments of the third aspect of the invention and vice versa.

According to the fourth aspect of the invention, the object is achieved by a computer program comprising program code means for performing the steps of any of the embodiments of the first aspect of the invention, when said program is run on a computer.

According to the fifth aspect of the invention, the object is achieved by a computer readable medium carrying a computer program comprising program code means for performing the steps of any of the embodiments of the first aspect of the invention, when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are schematic and not drawn to scale.

DETAILED DESCRIPTION OF EXAMPLE EMBODIMENTS OF THE INVENTION

Figure 1:
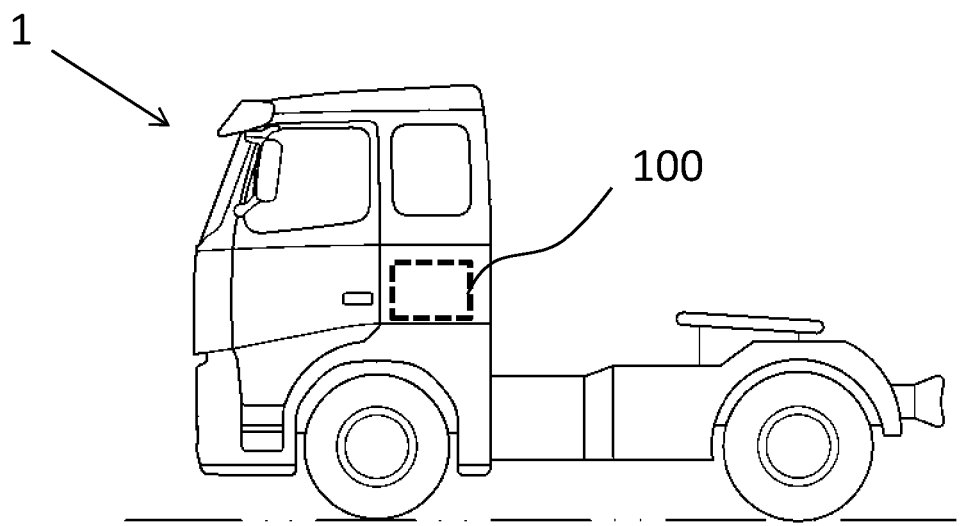
FIG. 1 is a side view of a vehicle according to an example embodiment of the present invention.

FIG. 1 shows a side view of a vehicle 1 in the form of a truck according to an example embodiment of the present invention. The truck 1 is here an electric truck comprising an electric powertrain (not shown), an ESS (not shown), regenerative braking functionality (not shown) and cruise control functionality (not shown). The truck 1 is a so called towing truck configured to tow one or more trailers (not shown). Even though a vehicle in the form of a towing truck 1 is shown, the present invention is not limited to only this type of vehicle, but may also be used for other vehicles, such as buses, construction equipment, including working machines in the form of wheel loaders, excavators etc. The present invention is also applicable to passenger cars. In addition, the vehicle may be a fully electric vehicle or it may be a hybrid vehicle, also comprising e.g. an internal combustion engine.

The truck 1 as shown also comprises a control unit 100 which is configured to perform the steps of the method according to the first aspect of the invention. The control unit 100 may comprise a computer program and/or a computer readable medium as disclosed herein. The control unit 100 may include a microprocessor, microcontroller, programmable digital signal processor or another programmable device. The control unit 100 may also, or instead, include an application specific integrated circuit, a programmable gate array or programmable array logic, a programmable logic device, or a digital signal processor. Where the control unit 100 includes a programmable device such as the microprocessor, microcontroller or programmable digital signal processor mentioned above, the processor may further include computer executable code that controls operation of the programmable device. The control unit 100 may comprise embedded hardware, sometimes with integrated software. Examples of physical relationships are: shared casing and components mounted on one or several circuit boards. The control unit 100 may also comprise one or more sub-control units, i.e. the control unit 100 may be more than one single control unit.

Figure 2:
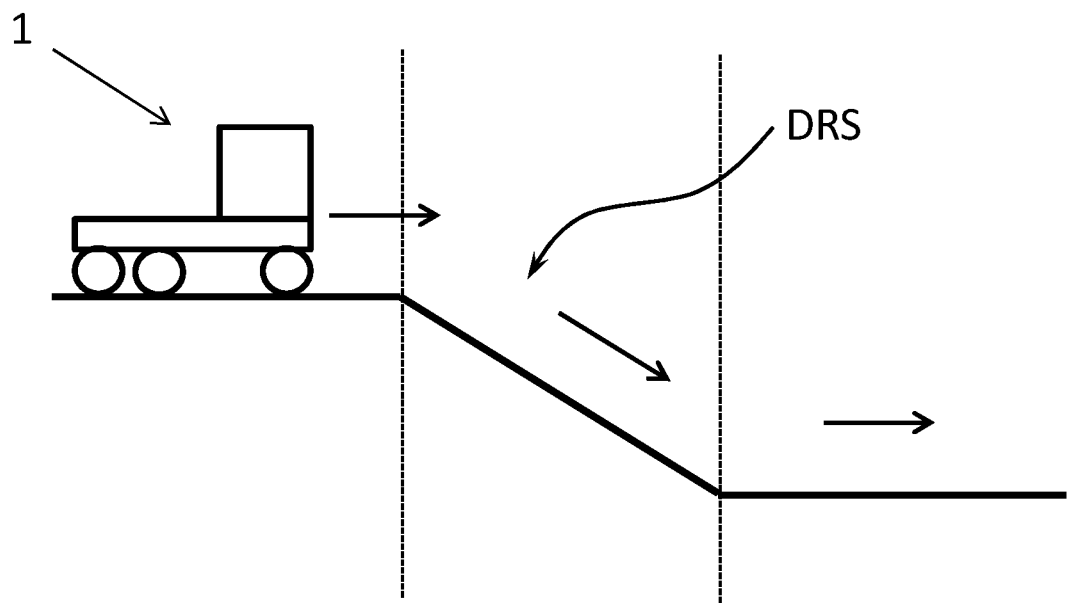
FIG. 2 is a schematic view of a vehicle according to an example embodiment of the present invention when it drives on a road with a downhill road segment.
Figure 3:
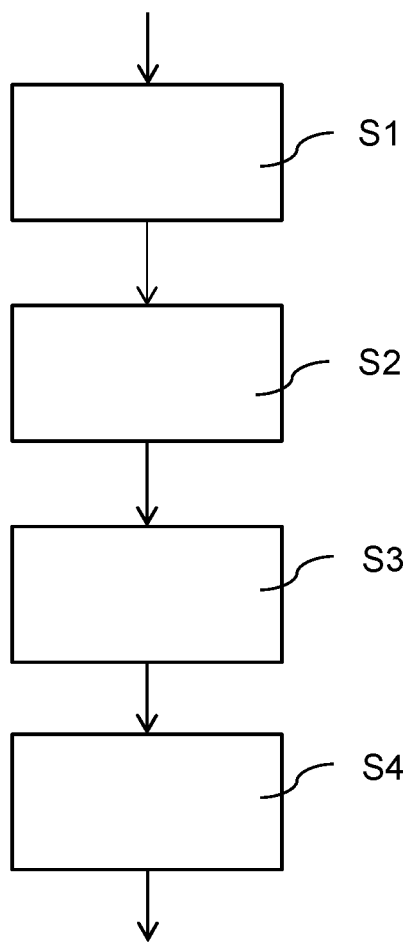
FIG. 3 is a flowchart of a method according to an example embodiment of the present invention.

With respect to FIGS. 2 and 3, an example embodiment of the method according to the first aspect of invention will be described.

The method is a method for controlling e.g. the vehicle 1 as shown in FIG. 1, wherein the cruise control functionality is configured to maintain a set cruise control speed of the vehicle 1 during downhill travel by applying the regenerative braking functionality.

The method comprises:

S1) obtaining a tolerance limit for an allowed increase in energy consumption caused by non-use or reduced use of regenerative braking during downhill travel;

S2) obtaining information relating to an upcoming downhill road segment DRS;

based on the information relating to the upcoming downhill road segment DRS,

S3) setting an allowed overspeed, caused by non-use or reduced use of the regenerative braking functionality, wherein the allowed overspeed exceeds the set cruise control speed for the upcoming downhill road segment DRS and is set based on the tolerance limit, preferably set so that the tolerance limit is not exceeded; and in the upcoming downhill road segment DRS, S4) controlling regenerative braking of the vehicle 1 based on the set allowed overspeed, thereby reducing or preventing regenerative braking during the downhill travel.

The method may further comprise identifying the upcoming downhill road segment DRS during travelling. This may as mentioned in the above for example be done by use of a forward looking perception sensor (not shown) of the vehicle 1. As such, the vehicle 1 may, by use of the forward looking perception sensor, obtain information relating to the upcoming downhill road segment DRS which may comprise information about inclination and length of the upcoming downhill road segment DRS. Alternatively or additionally, the obtained information may be obtained from e.g. map data as also mentioned in the above.

The allowed overspeed may further be set based on weight information of the vehicle 1. For example, the total weight of the truck 1, or truck and trailer, may vary depending on if the truck 1 is loaded or not. The allowed overspeed may further be based on dimension information of the vehicle 1. For example, the dimensions of the vehicle 1 may also vary depending on if a trailer is connected or not, which in turn may affect the vehicle's aerodynamic properties.

In order to further improve the setting of the allowed overspeed, the allowed overspeed is set based on driveline simulations in which, for the upcoming downhill road segment DRS, net energy consumption is determined for different overspeeds exceeding the set cruise control speed. For example, net energy consumption may by the driveline simulations be determined for overspeeds of 1 to 10 kilometres per hour (km/h) above the set cruise 30 control speed. The set cruise control speed may for example be set to 80 km/h, and thereby driveline simulations may be performed for overspeeds corresponding to a total speed of 81-90 km/h. Accordingly, an appropriate overspeed may be selected and used during downhill travel in the downhill road segment DRS, which overspeed may be set so that the set tolerance limit is not exceeded. As mentioned in the above, the tolerance limit may for example be set to a 0-5% increase in energy consumption. In fact, the present invention is based on a realization of the inventors that energy savings due to regenerative braking can be very small compared to e.g. rolling without disconnecting the driveline and allowing for some overspeed.

According to an embodiment of the present invention, the allowed overspeed is set so that it does not exceed a predetermined maximum allowed overspeed. The predetermined maximum allowed overspeed may for example be based on speed regulations.

In addition, the allowed overspeed may further be set based on driveline simulations in which, for the upcoming downhill road segment DRS, net energy consumption and energy throughput of the ESS are determined for different overspeeds exceeding the set cruise control speed.

To further improve the method, the driveline simulations may be associated with one or more vehicle properties, such as any one of vehicle weight and vehicle dimensions. Accordingly, the driveline simulations may be performed for the vehicle 1 when loaded and unloaded, when it is connected to a trailer or not etc. Thereby, an appropriate allowed overspeed may be found which corresponds to the current characteristics of the vehicle 1.

The allowed overspeed may further be set so that the energy throughput of the ESS of the vehicle 1 is not exceeding a predetermined energy throughput threshold value. By also setting the allowed overspeed so that the energy throughput is not exceeding a predetermined energy throughput threshold value, the service life of the ESS may be further increased.

The method may further comprise determining a SOC level of the ESS, and, in the upcoming downhill road segment DRS, controlling regenerative braking of the vehicle 1 based on the set cruise control speed when the SOC level is below a SOC threshold value. The SOC threshold value may for example be set to a 10% SOC level. Thereby, if 30 the SOC level of the ESS is below the 10% SOC level, the vehicle 1 may be braked by use of the regenerative braking functionality so that it e.g. maintains the set cruise control speed of 80 km/h when travelling in the downhill road segment DRS.

The obtained information relating to the upcoming downhill road segment DRS may comprise information about any one of current weather data during travelling, road condition data, road curvature data, and road data relating to a road segment following the upcoming downhill road segment.

The allowed overspeed, e.g. a total speed of 90 km/h, may further be set based on information about a planned route for the vehicle, such as a planned route including one or more planned stops, which one or more planned stops may include recharging of the ESS. For example, the vehicle 1 may be on a planned route in which it plans to stop shortly after the downhill road segment DRS has ended. The stop may for example be a lunch break for the driver where also the ESS will be recharged. As such, there may be no need of charging the ESS by use of regenerative braking in the downhill road segment DRS since it soon anyhow will be recharged during the lunch break. Thereby, energy throughput of the ESS may be avoided or reduced by allowing an increased overspeed instead of the set cruise control speed. Purely by way of example, the obtained tolerance limit may in some occasions be exceeded if e.g. it is anyhow planned to recharge the ESS shortly after the downhill road segment DRS.

The obtained tolerance limit may be set by a user of the vehicle or may be a fixed predefined tolerance limit, as mentioned in the above.

It is to be understood that the present invention is not limited to the embodiments described above and illustrated in the drawings; rather, the skilled person will recognize that many changes and modifications may be made within the scope of the appended claims.

The invention claimed is:

1. A method for controlling a vehicle comprising an electric powertrain, an energy storage system, regenerative braking functionality and cruise control functionality, wherein the cruise control functionality is configured to maintain a set cruise control speed of the vehicle during downhill travel by applying the regenerative braking functionality, the method comprising: obtaining a tolerance limit for an allowed increase in energy consumption caused by non-use or reduced use of regenerative braking during downhill travel; obtaining information relating to an upcoming downhill road segment; based on the information relating to the upcoming downhill road segment, setting an allowed overspeed, caused by non-use or reduced use of the regenerative braking functionality, wherein the allowed overspeed exceeds the set cruise control speed for the upcoming downhill road segment and is set based on the tolerance limit; and in the upcoming downhill road segment, controlling regenerative braking of the vehicle based on the set allowed overspeed, thereby reducing or preventing regenerative braking during the downhill travel.

2. The method according to claim 1, further comprising identifying the upcoming downhill road segment during travelling.

3. The method according to claim 1, wherein the obtained information relating to the upcoming downhill road segment comprises information about inclination and length of the upcoming downhill road segment.

4. The method according to claim 1, wherein the allowed overspeed is further set based on weight information of the vehicle.

5. The method according to claim 1, wherein the allowed overspeed is further set based on driveline simulations in which, for the upcoming downhill road segment, net energy consumption is determined for different overspeeds exceeding the set cruise control speed.

6. The method according to claim 5, wherein the allowed overspeed is further set based on driveline simulations in which, for the upcoming downhill road segment, net energy consumption and energy throughput of the energy storage system are determined for different overspeeds exceeding the set cruise control speed.

7. The method according to claim 6, wherein the allowed overspeed is set so that the energy throughput of the energy storage system is not exceeding a predetermined energy throughput threshold value.

8. The method according to claim 5, wherein the driveline simulations are associated with one or more vehicle properties, such as any one of vehicle weight and vehicle dimensions.

9. The method according to claim 1, further comprising determining a state of charge level of the energy storage system, wherein the method further comprises, in the upcoming downhill road segment, controlling regenerative braking of the vehicle based on the set cruise control speed when the SOC level is below a SOC threshold value.

10. The method according to claim 1, wherein the obtained information relating to the upcoming downhill road segment comprises information about any one of current weather data during travelling, road condition data, road curvature data, and road data relating to a road segment following the upcoming downhill road segment.

11. The method according to claim 1, wherein the allowed overspeed is further set based on information about a planned route for the vehicle, such as a planned route including one or more planned stops, which one or more planned stops may include recharging of the energy storage system.

12. The method according to claim 1, wherein the obtained tolerance limit is set by a user of the vehicle or is a fixed predefined tolerance limit.

13. A control unit for controlling a vehicle comprising an electric powertrain, an energy storage system, regenerative braking functionality and cruise control functionality, the control unit being configured to perform the steps of the method according to claim 1.

14. A vehicle comprising an electric powertrain, an energy storage system, regenerative braking functionality and cruise control functionality, and further comprising the control unit according to claim 13.

15. A non-transitory computer readable medium carrying a computer program comprising program code for performing the steps of claim 1, when said program code is run on a computer.

* * * * *